US012760240B2

(12) United States Patent
Bernoud

(10) Patent No.: US 12,760,240 B2
(45) Date of Patent: Oct. 13, 2026

(54) METHOD FOR FRACTIONATING A SHEA EXTRACT

(71) Applicant: BIOSYNTHIS, Saint Cyr Sous Dourdan (FR)

(72) Inventor: Thierry Bernoud, Saint Cyr Sous Dourdan (FR)

(73) Assignee: BIOSYNTHIS, Saint Cyr Sous Dourdan (FR)

( * ) Notice: Subject to any disclaimer, the term of this patent is extended or adjusted under 35 U.S.C. 154(b) by 585 days.

(21) Appl. No.: 18/280,705

(22) PCT Filed: Mar. 14, 2022

(86) PCT No.: PCT/EP2022/056583
§ 371 (c)(1),
(2) Date: Oct. 25, 2023

(87) PCT Pub. No.: WO2022/189678
PCT Pub. Date: Sep. 15, 2022

(65) Prior Publication Data
US 2024/0158719 A1 May 16, 2024

(30) Foreign Application Priority Data
Mar. 12, 2021 (EP) .................................... 21162465

(51) Int. Cl.
*C11B 7/00* (2006.01)

(52) U.S. Cl.
CPC .................................. *C11B 7/0025* (2013.01)

(58) Field of Classification Search
CPC ........ C11B 7/00; C11B 7/0025; C11B 9/0019
See application file for complete search history.

(56) References Cited

U.S. PATENT DOCUMENTS

| | | | |
|---|---|---|---|
| 2,200,391 | A | 5/1940 | Freeman |
| 2,352,546 | A | 6/1944 | Jenkins |
| 2,524,103 | A | 10/1950 | Gloyer |
| 2,549,661 | A | 4/1951 | Carney |
| 2,608,564 | A | 8/1952 | Young et al. |
| 2,705,723 | A | 4/1955 | Hoerr |
| 2015/0264956 | A1 | 9/2015 | Miller |

FOREIGN PATENT DOCUMENTS

| | | | |
|---|---|---|---|
| EP | 0 358 543 | A1 | 3/1990 |
| EP | 0 460 722 | A1 | 12/1991 |
| EP | 3 587 543 | A1 | 1/2020 |
| JP | 2011-132207 | A | 7/2011 |
| JP | WO2011/122278 | A1 | 7/2013 |
| JP | 2016-054675 | A | 4/2016 |
| WO | 2018/226149 | A1 | 12/2018 |

OTHER PUBLICATIONS

Jun. 24, 2024 Office Action issued in European Patent Application No. 22710126.8.
Jan. 10, 2025 Office Action issued in European Patent Application No. 22710126.8.
May 20, 2022 International Search Report issued in International Patent Application No. PCT/EP2022/056583.
Karleskind et al., "Fats and Oils Manual", 1993, pp. 204-207, 736-745, 928-933.
De Leon Izeppi et al., "Economic risk assessment using Monte Carlo simulation for the production of azelaic acid and pelargonic acid from vegetable oils", Industrial Crops & Products, vol. 150, 2020, 112411.
Aug. 13, 2021 Extended Search Report issued in European Patent Application No. 21162465.5.
May 20, 2022 Written Opinion issued in International Patent Application No. PCT/EP2022/056583.

*Primary Examiner* — Jafar F Parsa
(74) *Attorney, Agent, or Firm* — Oliff PLC

(57) ABSTRACT

A method of fractionating a shea extract includes: mixing and homogenization of shea butter using a solvent system having at least one oxoester of formula I, Formula I

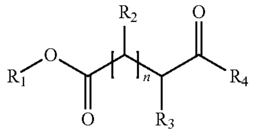

in which $R_1$ is selected from the group made of linear or branched alkyls having from 1 to 8 carbon atoms, $R_2$, $R_3$, and $R_4$, which are identical or different, are selected from the group made of the hydrogen atom or linear or branched alkyls having from 1 to 4 carbon atoms, and n is a natural number between 1 and 4; obtaining a homogeneous mixture; cooling of the mixture; and filtration and removal of the solvent system in order to recover the olein and stearin fractions.

27 Claims, No Drawings

METHOD FOR FRACTIONATING A SHEA EXTRACT

The invention relates to a method of fractionating a shea extract which enables the fractionation, separation, and recovery of the two constituent factions of shea, which are shea olein and stearin.

Shea extract is understood to mean a material that is derived from shea fruit or seeds. Shea extract can be obtained by a traditional method, mechanical pressure, cold extraction, and/or solvent extraction. These techniques are detailed in *Oils and Fats Manual* by Alain KARLESKIND (TEC & DOCS, 1993).

In the present application, the shea extract is preferably shea butter.

For the purposes of the present invention, shea butter is a vegetable fatty substance that is solid at room temperature, is extracted from shea fruit or seeds, and melts at temperatures close to those of the skin.

The shea butter that is used in the present invention can be obtained by a traditional method, solvent extraction, and/or cold extraction.

The shea butter that is used in the present invention is preferably refined and originates from organic farming certified CEE/NOP organic by FR-BIO-01 and ECOCERT SA.

To achieve this, the shea butter can undergo a degumming step, a discoloration step, a deodorization step, and/or a neutralization step.

The degumming stage, also referred to as the demucilagination stage, removes the latex from the vegetable butter. In botany, latex is a liquid substance with a more or less thick consistency that is secreted by certain plants or by certain fungi and circulates in the lactiferous ducts. During refining, raw vegetable butter is degummed by mixing the oil with water or steam and passing the mixture through centrifuges that separate the gummy residue from the oil.

The decolorization step eliminates colored pigments (chlorophylls and carotenoids), residual soaps, traces of mucilage and heavy metals, particularly through the use of activated earths. Decolorizing earths are generally plastic clays that are simply dried and finely ground to increase their contact surface. Activated charcoal can also be used.

The deodorization step is intended to eliminate odorous substances (mainly sulfur compounds) from the discolored oil. This operation is commonly carried out under vacuum at high temperature. This involves steam entrainment under vacuum of these compounds which result from the degradation of the oil.

Neutralization or deacidification involves removing free fatty acids from the demucilaged oil. The most commonly used vegetable oil neutralization techniques are:

Chemical or alkaline neutralization (using soda or lime).

Physical neutralization (by distillation).

In addition to the elimination of free fatty acids, neutralization makes it possible to eliminate all phospholipids, traces of metals, and products degraded by oxidation.

The shea butter that is used in the present invention may be raw shea butter. Raw shea butter is understood to mean shea butter that has not undergone any refining stage.

A fractionation process is understood to mean a process for separating a mixture into several successive fractions whose physical properties are different.

In the case of the present invention, fractionation consists in separating the shea extract into fractions with different physical characteristics. The shea extract can thus be separated into an oil commonly referred to as the shea olein fraction and a solid fraction, namely shea stearin, whose melting point is higher than the starting shea extract.

For the purposes of the present invention, the shea olein fraction is a fraction of fatty acids which is liquid at room temperature and in which the percent by weight of oleic acid is greater than the percent by weight of each fatty acid of which it is composed. More precisely, the percent by weight of oleic acid is at least 50% relative to the total weight of fatty acid in the shea olein fraction.

Analogously, the shea stearin fraction is a fatty acid fraction which is solid at room temperature and in which the percent by weight of stearic acid is greater than the percent by weight of each fatty acid of which it is composed. More precisely, the percent by weight of stearic acid is at least 45% relative to the total weight of fatty acid in the shea stearin fraction.

In the present application, a "percent by weight" is the ratio of the mass of a first compound relative to the total mass of a mixture of compounds or composition, expressed as a percentage.

Such vegetable fractions can have various uses in the food and cosmetic industries.

JP2011132207A describes cosmetic compositions comprising a raw material derived from shea butter.

JP2016054675A describes compositions of edible creams (coffees, etc.) comprising a raw material derived from shea butter.

WO2018226149 and EP0460722A1 disclose cocoa butter equivalents comprising shea stearin.

As illustrated in US2015264956A1 and WO2011122278, the usual processes for fractionating vegetable oils and, in particular, shea butter can include several stages of fractionation and/or additional treatments.

Furthermore, the nature or quantity of solvents used during solvent fractionation processes may be unsuitable both from an economic point of view and from a toxicological and environmental point of view.

The solvents that are most commonly used to fractionate shea extract are hexane-type aliphatic solvents or preferably acetone.

Application EP18757927 discloses fractionation processes that are carried out using these two types of solvent.

Hexane is an organic solvent that is considered toxic and is classified as CMR category 2. Furthermore, given its physicochemical properties, this solvent poses a handling hazard, and all the more so on an industrial scale (flash point −23.3° C./ignition point 233° C.).

Meanwhile, acetone is a volatile and flammable solvent (flash point −18° C.) that is widely used in the chemical industry. However, its high volatility requires a volume of solvent in industrial processes that may be unsuitable from an economic and environmental point of view.

However, U.S. Pat. No. 2,200,391, published in 1940, describes a method for solvent extraction of oils such as linseed oil, soybean oil, or even fish oils which makes it possible to selectively separate the treated oil into two liquid fractions, one comprising the solvent saturated in a fraction that is rich in unsaturated fatty acids and a second liquid fraction consisting of fatty acids that are relatively poor in unsaturated fatty acids. The use of solvents such as methyl levulinate and ethyl levulinate is considered.

Apart from the age of this prior art document, those skilled in the art would not have been encouraged to use the method described in that document for the reasons set out below.

Shea butter has a fatty acid composition which differs substantially from those of the oils considered in U.S. Pat.

No. 2,200,391. Indeed, shea butter is a specific oil, its composition in saturated fatty acids and unsaturated fatty acids is balanced, and its polyunsaturated fatty acid content (<10% relative to the total weight of fatty acid in the composition) is low. On the other hand, as the article by G. A. De Leon Izeppi, J.-L. Dubois, A. Balle, and A. Soutelo-Maria in *Industrial Crops and Products*, Vol. 150; 2020 attests, soybean oil is rich in unsaturated fatty acids. More precisely, the distribution of unsaturated fatty acids is 85%, whereas the fraction of saturated fatty acids represents 15% with respect to the total weight of fatty acids in soybean oil. It is important to note that, among these 85% unsaturated fatty acids, more than 60% are polyunsaturated fatty acids. In linseed oil, the distribution of unsaturated and saturated fatty acids is similar to that of soybean oil, and this oil also has a polyunsaturated fatty acid content of greater than 60% with respect to the total weight of fatty acid in this oil.

What is more, shea butter differs from linseed or soybean oil through its high content of unsaponifiable materials. In fact, the content of unsaponifiable materials are generally less than 3% for the oils described in U.S. Pat. No. 2,200,391, while it can reach up to 15% for shea butter.

Furthermore, oils or oil extracts containing elevated levels of unsaponifiable matter are particularly sought after by cosmetic formulators for their remarkable activity. More specifically, the molecules constituting the unsaponifiable materials have antioxidant and/or anti-inflammatory properties, making them compounds of choice for the formulations of anti-wrinkle or anti-aging compositions.

In addition to the abovementioned difference in chemical composition, the oils considered in D1 are liquid oils that do not solidify at low temperatures, whereas shea butter is a concrete oil having the form of a butter at room temperature.

Furthermore, the examples in U.S. Pat. No. 2,200,391 that are produced from linseed or soybean oils, and more particularly the high iodine index of the two fractions that are separated according to the method of U.S. Pat. No. 2,200,391, indicate that two fractions which are rich in unsaturated fatty acids are obtained. Even if one of the two fractions is slightly more enriched than the other in unsaturated fatty acids, the object that is being pursued is not achieved.

Thus, in view of the differences mentioned above and the inconclusive tests of U.S. Pat. No. 2,200,391, the fractionation of shea butter using the solvent system claimed in terms of the present invention in order to recover a fraction of shea olein and shea stearin was not obvious to those skilled in the art from the teachings disclosed in U.S. Pat. No. 2,200,391. It is preferred if the two fractions obtained satisfy the regulatory requirements of the cosmetics and food industry.

The present invention makes it possible to directly fractionate a shea extract without further treatment using a solvent system and to simultaneously recover a fraction of shea olein and shea stearin, the two fractions satisfying the regulatory requirements of the cosmetics and food industry.

The present invention is a method of fractionating a shea extract which comprises at least the following steps:

a) mixing and homogenization of shea butter using a system of solvents comprising at least one oxoester of formula I.

Formula I

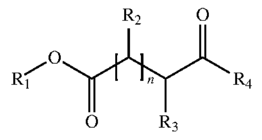

in which $R_1$ is selected from the group consisting of linear or branched alkyls comprising from 1 to 8 carbon atoms;

$R_2$, $R_3$, and $R_4$, which are identical or different, are selected from the group consisting of the hydrogen atom or linear or branched alkyls comprising from 1 to 4 carbon atoms; and n is a natural number between 1 and 4.

b) obtaining a homogeneous mixture, c) cooling of the mixture, d) filtration and removal of the solvent system in order to recover the olein and stearin fractions.

In one embodiment, the solvents of the solvent system are biobased. In terms of the present invention, a compound or an organic composition is considered to be "biobased" if the organic carbon that is present in the compound or composition is of vegetable origin based on a radiocarbon analysis according to one of the following standards: ASTM D6866, EN 16640, or EN 16785-1.

In one embodiment, the method according to the invention is characterized in that the shea extract is derived from shea seeds.

In one embodiment, the method according to the invention is characterized in that the shea extract is a shea butter.

In one embodiment, the method according to the invention is characterized in that the shea extract is a so-called natural shea butter.

In one embodiment, the method according to the invention is characterized in that the shea extract is a refined shea butter.

In one embodiment, the method according to the invention is characterized in that the shea extract is a refined shea butter having undergone refining including a degumming step.

In one embodiment, the method according to the invention is characterized in that the shea extract is a refined shea butter having undergone refining including a decolorization step.

In one embodiment, the method according to the invention is characterized in that the shea extract is a refined shea butter having undergone refining including a deodorization step.

In one embodiment, the method according to the invention is characterized in that the shea extract is a refined shea butter having undergone refining including a neutralization step.

In a preferred embodiment, the method according to the invention is characterized in that the shea extract is a refined shea butter having undergone refining steps comprising a degumming step, a decolorization step, a deodorization step, and a neutralization step.

In one embodiment, the method according to the invention is characterized in that in the homogeneous mixture obtained in step b), defined by the ratio Y, $$Y = \frac{\text{percent by weight of shea extract}}{\text{percent by weight of the solvent system}}$$

is no more than 1/1.

In one embodiment, the method according to the invention is characterized in that the ratio Y is no more than 1/2.

In one embodiment, the method according to the invention is characterized in that the ratio Y is no more than 1/3.

In one embodiment, the method according to the invention is characterized in that the ratio Y is no more than 1/5.

In one embodiment, the method according to the invention is characterized in that the ratio Y is between 1/5 to 1/1.

In one embodiment, the method according to the invention is characterized in that the ratio Y is 1/1.

In one embodiment, the method according to the invention is characterized in that the ratio Y is 1/2.

In one embodiment, the method according to the invention is characterized in that the ratio Y is 1/3.

In one embodiment, the method according to the invention is characterized in that the ratio Y is 1/4.

In one embodiment, the method according to the invention is characterized in that the solvent system is free of solvent categorized as CMR.

In one embodiment, the method according to the invention is characterized in that the solvent system has a flash point of less than or equal to 110° C. as measured according to the ATSM D93 standard.

In one embodiment, the method according to the invention is characterized in that the solvent system has a flash point of less than or equal to 100° C. as measured according to the ATSM D93 standard.

In one embodiment, the method according to the invention is characterized in that the solvent system has a flash point of less than or equal to 95° C. as measured according to the ATSM D93 standard.

In one embodiment, the method according to the invention is characterized in that the solvent system has a flash point of less than or equal to 90° C. as measured according to the ATSM D93 standard.

In one embodiment, the method according to the invention is characterized in that the solvent system has a boiling temperature of less than or equal to 250° C.

In one embodiment, the method according to the invention is characterized in that the solvent system has a boiling temperature of less than or equal to 230° C.

In one embodiment, the method according to the invention is characterized in that the solvent system has a boiling temperature of less than or equal to 210° C.

In one embodiment, the method according to the invention is characterized in that the solvent system comprises at least one oxoester of formula II:

Formula II

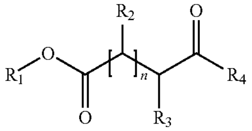

in which $R_1$ is selected from the group consisting of linear or branched alkyls comprising from 1 to 4 carbon atoms;

$R_2$, $R_3$, and $R_4$, which are identical or different, are selected from the group consisting of the hydrogen atom or linear or branched alkyls comprising from 1 to 4 carbon atoms; and and n is a natural number between 1 and 4.

In one embodiment, the method according to the invention is characterized in that the solvent system comprises at least one oxoester of formula III:

Formula III

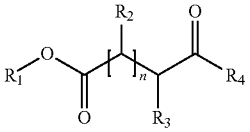

$R_1$ is selected from the group consisting of linear or branched alkyls comprising from 1 to 4 carbon atoms;

$R_2$ and $R_3$, which are identical or different, are selected from the group consisting of the hydrogen atom, the methyl group, or the ethyl group;

$R_4$ is selected from the group consisting of linear or branched alkyls comprising from 1 to 3 carbon atoms;

and n is a natural number between 1 and 3.

In one embodiment, the method according to the invention is characterized in that the solvent system comprises at least one oxoester of formula IV:

Formula IV

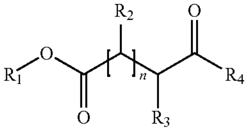

$R_1$ is selected from the group consisting of linear or branched alkyls comprising from 1 to 8 carbon atoms;

$R_2$ and $R_3$ are a hydrogen atom;

$R_4$ is a methyl group;

and n is equal to 1.

In one embodiment, the method according to the invention is characterized in that the solvent system comprises at least one oxoester of formula V:

Formula V

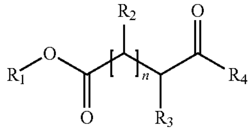

$R_1$ is selected from the group consisting of linear or branched alkyls comprising from 1 to 4 carbon atoms;

$R_2$ and $R_3$ are a hydrogen atom;

$R_4$ is a methyl group;

and n is equal to 1.

In one embodiment, the method according to the invention is characterized in that the solvent system is composed of an oxoester which is present alone or as a mixture.

In one embodiment, the method according to the invention is characterized in that the oxoester which is present alone or as a mixture is selected from the group comprising: methyl levulinate (CAS 624-45-3), ethyl levulinate (CAS 539-88-8), propyl levulinate (645-67-0), isopropyl levulinate (CAS 21884-26-4), butyl levulinate (CAS 2052-15-5), isobutyl levulinate (CAS 3757-32-2), tert-butyl levulinate (CAS 2854-10-6), s-butyl levulinate (CAS 85734-01-6), penthyl levulinate (CAS 20279-49-6) hexyl levulinate (CAS 24431-34-3), octyl levulinate (CAS 41780-57-8), 2-methyl-4-oxovaleric acid ethyl ester (CAS 4749-12-6), methyl-6-oxoheptanoate (CAS 2046-21-1), methyl 4-oxohexanoate (CAS 2955-62-6), methyl 5-oxohexanoate (CAS 13984-50-

4), methyl 3-methyl-5-oxohexanoate (CAS 14983-18-7), 5-ketoenanthic acid methyl ester (17745-32-3), methyl 3-methyl-4-oxopentanoate (CAS 25234-83-7), methyl 2-methyl-4 oxopentanoate (CAS 32811-25-9), 4-oxo-5-methylhexanoic acid methyl ester (CAS 34553-37-2), pentanoic acid, 2,3 dimethyl-4-oxo-, methyl ester (CAS 35140-52-4), hexanoic acid, 4-methyl-5-oxo-, methyl ester (CAS 36045-56-4), pentanoic acid, 2-ethyl-4-oxo-, methyl ester (CAS 62359-06-2), methyl 3-methyl-4-oxohexanoate (CAS 69448-35-7), hexanoic acid, 2-methyl-5-oxo-, methyl ester (CAS 38872-30-9), pentanoic acid, 3-methyl-4-oxo-, ethyl ester (CAS 55424-74-3), hexanoic acid, 2-ethyl-4-oxo-, methyl ester (CAS 75436-59-8), hexanoic acid, 2,4-dimethyl-5-oxo-, methyl ester (CAS 93176-58-0), pentanoic acid, 4-oxo-2-propyl-methyl ester (CAS 244196-06-3), hexanoic acid, 2,5-dimethyl-4-oxo-, methyl ester (CAS 1249353-11-4), octanoic acid 4-oxo-, methyl ester (CAS: 4316-48-7), heptanoic acid, 2-methyl-6-oxo-, methyl ester (CAS 2570-90-3), heptanoic acid, 3-methyl 6-oxo-, methyl ester (CAS 5128-55-2), heptanoic acid, 6-methyl-5-oxo-, methyl ester (CAS 23575-33-9), hexanoic acid, 3-methyl-5-oxo-, ethyl ester (CAS 38052-21-0), heptanoic acid, 2-methyl-5-oxo-, methyl ester (CAS 25912-38-3), heptanoic acid, 4 methyl-6-oxo-, methyl ester (CAS 41841-53-6), heptanoic acid, 5 methyl-4-oxo-, methyl ester (CAS 42511-74-0), heptanoic acid, 4-methyl-5-oxo-, methyl ester (CAS 54225-40-0), hexanoic acid, 3,5-dimethyl-4-axe-, methyl ester (CAS 64712-02-3), heptanoic acid, 6-methyl-4-oxo-, methyl ester (CAS 76678-33-6), heptanoic acid, 2-methyl-4-oxo-, methyl ester (CAS 90647-21-5), hexanoic acid, 4-ethyl-5-oxo-, methyl ester (CAS 90647-24-8), heptanoic acid, 3-methyl-5-oxo-, methyl ester (CAS 103252-99-9), hexanoic acid, 2-ethyl-5-oxo-, methyl ester (CAS 103260-39-5), hexanoic acid, 3-acetyl methyl ester (CAS 1081559-93-4), heptanoic acid, 5 methyl-6-oxo-, methyl ester (CAS 344295-02-9), heptanoic acid, 3-methyl-4-exo-, methyl ester (CAS 64712-01-2), methyl 2-(1methylethyl)-4-oxo-pentanoate (CAS 99183-33-2), methyl 2,3-dimethyl-4-oxo-hexanoate (CAS 86044-19-1), ethyl 2-ethyl-4-oxopentanoate (CAS 101514-30-1), hexanoic acid, 5-oxo-, ethyl ester (CAS 13984-57-1), ethyl 3-methyl-4-oxohexanoate (CAS 42895-72-7), ethyl 2,3-dimethyl-4-oxopentanoate (CAS 136964-44-8), hexanoic acid, 4 axe-, ethyl ester (CAS 3249-33-0), heptanoic acid, 6-oxo-, ethyl ester (CAS 30956-41-3), 1-methylethyl-4-oxohexanoate (CAS 939422-07-8), pentanoic 2-ethyl-4-oxo-, ethyl ester (CAS 101514-30-1), hexanoic acid, 2-ethyl-5-methyl-4-oxo-, methyl ester (CAS 1195311-69-3).

In one embodiment, the method according to the invention is characterized in that the oxoester which is present alone or as a mixture is selected from the group of the levulinates comprising: methyl levulinate (CAS 624-45-3), ethyl levulinate (CAS 539-88-8), propyl levulinate (645-67-0), isopropyl levulinate (CAS 21884-26-4), butyl levulinate (CAS 2052-15-5), isobutyl levulinate (CAS 3757-32-2), tert-butyl levulinate (CAS 2854-10-6), s-butyl levulinate (CAS 85734-01-6), penthyl levulinate (CAS 20279-49-6) hexyl levulinate (CAS 24431-34-3), octyl levulinate (CAS 41780-57-8), isoamyl levulinate (CAS 71172-75-3).

In one embodiment, the method according to the invention is characterized in that the oxoester which is present alone or as a mixture is selected from the group comprising: methyl 3-methyl-4-oxopentanoate (CAS 25234-83-7), methyl 2-methyl-4-oxopentanoate (CAS 32811-25-9), pentanoic acid, 2,3 dimethyl-4-oxo-, methyl ester (CAS 35140-52-4), pentanoic acid, 2-ethyl-4-oxo-, methyl ester (CAS 62359-06-2), pentanoic acid, 3-methyl-4-oxo-, ethyl ester (CAS 55424-74-3), pentanoic acid, 4-oxo-2-propyl-methyl ester (CAS 244196-06-3), methyl 2-(1-methylethyl)-4-oxo-, pentanoate (CAS 99183-33-2), ethyl 2-ethyl-4-oxopentanoate (CAS 101514-30-1), ethyl 2,3-dimethyl-4-oxopentanoate (CAS 136964-44-8), pentanoic 2-ethyl-4-oxoethyl ester (CAS 101514-30-1).

In one embodiment, the method according to the invention is characterized in that the oxoester which is present alone or as a mixture is selected from the group comprising: methyl 4-oxohexanoate (CAS 2955-62-6), methyl 5-oxo-hexanoate (CAS 13984-50-4), methyl 3-methyl-5-oxo-hexanoate (CAS 14983-18-7), 4-oxo-5-methylhexanoic acid methyl ester (CAS 34553-37-2), hexanoic acid, 4-methyl-5-oxo-, methyl ester (CAS 36045-56-4), methyl 3-methyl-4-oxohexanoate (CAS 69448-35-7), hexanoic acid, 2-methyl-5-oxo-, methyl ester (CAS 38872-30-9), hexanoic acid, 2-ethyl-4-oxo-, methyl ester (CAS 75436-59-8), hexanoic acid, 2,4-dimethyl-5-oxo-, methyl ester (CAS 93176-58-0), hexanoic acid, 2,5-dimethyl-4-oxo-, methyl ester (CAS 1249353-11-4), octanoic acid, 4 oxo-, methyl ester (CAS: 4316-48-7), hexanoic acid, 3-methyl-5-oxo-, ethyl ester (CAS 38052-21-0), hexanoic acid, 3,5-dimethyl-4-oxo-, methyl ester (CAS 64712-02-3), hexanoic acid, 4-ethyl-5-oxo-, methyl ester (CAS 90647-24-8), hexanoic acid, 2-ethyl-5-oxo-, methyl ester (CAS 103260-39-5), hexanoic acid, 3 acetyl methyl ester (CAS 1081559-93-4), methyl 2,3-dimethyl-4-oxohexanoate (CAS 86044-19-1), hexanoic acid, 5-oxo-, ethyl ester (CAS 13984-57-1), ethyl 3-methyl-4-oxohexanoate (CAS 42895-72-7), hexanoic acid, 4-oxo-, ethyl ester (CAS 3249-33-0), 1-methylethyl-4-oxohexanoate (CAS 939422-07-8), hexanoic acid, 2-ethyl-5-methyl-4-oxo-, methyl ester (CAS 1195311-69-3).

In one embodiment, the method according to the invention is characterized in that the oxoester which is present alone or as a mixture is selected from the group comprising: 2-methyl-4-oxovaleric acid ethyl ester (CAS 4749-12-6), methyl 6-oxoheptanoate (CAS 2046-21-1), 5-ketoenanthic acid methyl ester (17745-32-3), octanoic acid, 4-oxo-, methyl ester (CAS: 4316-48-7), heptanoic acid, 2-methyl-6-oxo-methyl ester (CAS 2570-90-3), heptanoic acid, 3-methyl 6-oxo-, methyl ester (CAS 5128-55-2), heptanoic acid, 6-methyl-5-oxo-, methyl ester (CAS 23575-33-9), heptanoic acid, 2-methyl-5-oxo-, methyl ester (CAS 25912-38-3), heptanoic acid, 4 methyl-6-oxo-, methyl ester (CAS 41841-53-6), heptanoic acid, 5 methyl-4-oxo-, methyl ester (CAS 42511-74-0), heptanoic acid, 4-methyl-5-oxo-, methyl ester (CAS 54225-40-0), heptanoic acid, 6-methyl-4-oxo-, methyl ester (CAS 76678-33-6), heptanoic acid, 2-methyl-4-oxo-, methyl ester (CAS 90647-21-5), heptanoic acid, 3-methyl-5-oxo-, methyl ester (CAS 103252-99-9), heptanoic acid, 5 methyl-6-oxo-, methyl ester (CAS 344295-02-9), heptanoic acid, 3-methyl-4-oxo-, methyl ester (CAS 64712-01-2), heptanoic acid, 6-oxo-, ethyl ester (CAS 30956-41-3).

In one embodiment, the method according to the invention is characterized in that the oxoester has a molecular weight of less than or equal to 200 g/mol.

In one embodiment, the method according to the invention is characterized in that the oxoester has a molecular weight of less than or equal to 180 g/mol.

In one embodiment, the method according to the invention is characterized in that the oxoester has a molecular weight of less than or equal to 160 g/mol.

In one embodiment, the method according to the invention is characterized in that the oxoester has a molecular weight of less than or equal to 150 g/mol.

In one embodiment, the method according to the invention is characterized in that oxoester is methyl levulinate.

In one embodiment, the method according to the invention is characterized in that oxoester is butyl levulinate.

In one embodiment, the method according to the invention is characterized in that oxoester is ethyl levulinate.

In one embodiment, the method according to the invention is characterized in that oxoester is isoamyl levulinate.

In one embodiment, the method according to the invention is characterized in that oxoester is hexyl levulinate.

In the present application, an "alkene" is an unsaturated hydrocarbon consisting solely of carbon and hydrogen atoms linked together by single covalent bonds and obligatorily having at least one double bond between two carbon atoms. The general formula of an alkene is $C_nH_{2n}$; it is called a "linear alkene" when each carbon atom is bonded to a maximum of two carbon atoms and a "branched alkane" when certain carbon atoms are bonded to three or even four carbon atoms.

For the purposes of the present invention, cyclic alkenes are also called alkenes for which the carbons are linked by single bonds and obligatorily have at least one double bond between two carbon atoms so as to form a ring which is not planar.

In one embodiment, the method according to the invention is characterized in that the solvent system further comprises at least one alkene.

In one embodiment, the method according to the invention is characterized in that the solvent system further comprises at least one cyclic alkene.

In one embodiment, the composition according to the invention is characterized in that the cyclic alkene is selected from the group comprising the cyclic alkenes having from 8 to 12 carbon atoms, alone or as mixtures.

In one embodiment, the method according to the invention is characterized in that the solvent system further comprises limonene (CAS 5989-27-5).

In one embodiment, the method according to the invention is characterized in that the solvent system comprises a limonene and an ethyl levulinate.

In one embodiment, the method according to the invention is characterized in that the solvent system comprises a limonene and a butyl levulinate.

In one embodiment, the method according to the invention is characterized in that the solvent system comprises a limonene and an isoamyl levulinate.

In the present application, an "alkane" is a saturated hydrocarbon consisting solely of carbon and hydrogen atoms linked together by single covalent bonds whose general formula is $C_nH_{2n+2}$; it is referred to as a "linear alkane" if each carbon atom is bonded to no more than two carbon atoms and as a "branched alkane" if certain carbon atoms are bonded to three or even four carbon atoms.

For the purposes of the present invention, cyclic alkanes are also called alkanes for which the carbons are linked by single bonds so as to form a ring which is not planar. Their general formula is $C_nH_{2n}$.

In the present application, a "bioalkane" is a biobased alkane.

In the present application, a compound or an organic composition is considered to be "biobased" if the organic carbon that is present in the compound or composition is of vegetable origin based on a radiocarbon analysis according to one of the following standards: ASTM D6866, EN 16640, or EN 16785-1.

In one embodiment, the method according to the invention is characterized in that the solvent system further comprises at least one alkane.

In one embodiment, the method according to the invention is characterized in that the solvent system further comprises at least one volatile alkane.

In one embodiment, the method according to the invention is characterized in that the volatile alkane is selected from the group comprising the linear or branched alkanes having from 10 to 12 carbon atoms, alone or as mixtures.

In one embodiment, the method according to the invention is characterized in that the volatile alkene is selected from the group comprising the linear or branched alkanes having from 10 to 12 carbon atoms, alone or as mixtures.

In one embodiment, the method according to the invention is characterized in that the volatile alkene is selected from the group comprising the cyclic alkanes having from 10 to 12 carbon atoms, alone or as mixtures.

In one embodiment, the method according to the invention is characterized in that the solvent system further comprises a decane.

In one embodiment, the method according to the invention is characterized in that the solvent system further comprises a dodecane.

In one embodiment, the method according to the invention is characterized in that the solvent system further comprises a cyclic alkane or one which comprises at least one ring.

In one embodiment, the method according to the invention is characterized in that the alkane comprising at least one ring is pinane (CAS 473-55-2).

In one embodiment, the method according to the invention is characterized in that the alkane comprising at least one ring is p-menthane (CAS 99-82-1).

In one embodiment, the method according to the invention is characterized in that the solvent system further comprises a decane, a dodecane In one embodiment, the method according to the invention is characterized in that the solvent system further comprises a branched alkane having 10 carbon atoms.

In one embodiment, the method according to the invention is characterized in that the branched alkane having 10 carbon atoms is selected from the group comprising: 2-methylnonane (CAS 871-83-0), 4-methylnonane (CAS 17301-94-9), 3-methyl nonane (CAS 5911-04-6), 3-ethyloctane (CAS 5881-17-4), 2,2-dimethyloctane (CAS 15869-87-1), 2,3 dimethyl octane (CAS 7146-60-3), 2,5-dimethyl octane (CAS 15869-89-3), 3,5 dimethyl octane (CAS 15869-93-9), 4-propylheptane (CAS 3178-29-8), 3-ethyl-2-methylheptane (CAS 14676-29-0), 2,2,3-trimethylheptane (CAS 52896-92-1), 2,3,5-trimethylheptane (CAS 20278-85-7), 2,3,6-trimethylheptane (CAS 4032-93-3), 3,3,4-trimethylheptane (CAS 20278-87-9), 2,3,4-trimethylheptane (CAS 52896-95-4), 2,2,4-trimethylheptane (CAS: 14720-74-2), 3,3-diethylhexane (CAS 17302-02-2), 2,2,3,3-tetramethylhexane (CAS 13475-81-5), 3-ethyl-2,2,3-trimethylpentane (CAS 52897-17-3), and mixtures thereof.

In one embodiment, the method according to the invention is characterized in that the solvent system further comprises a branched alkane having 12 carbon atoms.

In one embodiment, the method according to the invention is characterized in that the branched alkane of 12 carbon atoms is selected from the group comprising: 2-methylundecane (CAS 7045-71-8), 3-methylundecane (CAS 1002-43-3), 4-methylundecane (CAS 2980-69-0), 5-methylundecane (CAS 1632-70-8), 6-methylundecane (CAS 17302-33-9), 2,4-dimethyldecane (CAS 2801-84-5) 4,4-dimethyldecane (CAS 17312-39-9), 3,5-dimethyldecane (CAS 17312-48-0), 2,5-dimethyldecane (CAS 17312-50-4), 2,3-dimethyldecane (CAS 17312-44-6), 3,3-dimethyldecane (CAS 17302-38-4), 3,7-dimethyldecane (CAS 17312-54-8), 3,4,6-trimethylnonane (CAS 62184-24-1) 3,5,6-trimethylnonane (CAS 62184-26-3), 3,5,7-trimethylnonane (CAS 62184-27-4), 2,5,7-trimethylnonane (CAS 62184-14-9), 2,5,6-trimethylnonane (CAS 62184-13-8), 2,5,7-trimethylnonane (CAS 62184-14-9), 2,5,8-trimethylnonane (CAS 49557-09-7), 3,3,4,5-tetramethyloctane (CAS 62185-21-1), 2,3,4,5-tetramethyloctane (CAS 62199-27-3), 2,2,4,5-tetramethyloctane (CAS 62183-80-6), 2,2,5,7-tetramethyloctane (CAS 62199-19-3), 2,3,4,7-tetramethyloctane (CAS 62199-29-5), 2,4,4,7-tetramethyloctane (CAS 35866-96-7), 3-ethyl-4-methylnonane (CAS 62184-45-6), 3-ethyl-4,5-dimethyloctane (CAS 62183-72-6), 2,5-dimethyl-6-ethyloctane (CAS 62183-50-0), and mixtures thereof.

In one embodiment, the method according to the invention is characterized in that the solvent system comprises at least one volatile alkane and one ethyl levulinate.

In one embodiment, the method according to the invention is characterized in that the solvent system comprises a decane and an ethyl levulinate.

In one embodiment, the method according to the invention is characterized in that the solvent system comprises a dodecane and an ethyl levulinate.

In one embodiment, the method according to the invention is characterized in that the solvent system comprises a decane, a dodecane, and an ethyl levulinate.

In one embodiment, the method according to the invention is characterized in that the solvent system comprises a branched alkane having 10 carbon atoms and an ethyl levulinate.

In one embodiment, the method according to the invention is characterized in that the solvent system comprises a branched alkane having 12 carbon atoms and an ethyl levulinate.

In one embodiment, the method according to the invention is characterized in that the solvent system comprises at least one volatile alkane and one butyl levulinate.

In one embodiment, the method according to the invention is characterized in that the solvent system comprises a decane and a butyl levulinate.

In one embodiment, the method according to the invention is characterized in that the solvent system comprises a dodecane and a butyl levulinate.

In one embodiment, the method according to the invention is characterized in that the solvent system comprises a pinane and a butyl levulinate.

In one embodiment, the method according to the invention is characterized in that the solvent system comprises a p-menthane and a butyl levulinate.

In one embodiment, the method according to the invention is characterized in that the solvent system comprises a decane, a dodecane, and a butyl levulinate.

In one embodiment, the method according to the invention is characterized in that the solvent system comprises a branched alkane having 10 carbon atoms and a butyl levulinate.

In one embodiment, the method according to the invention is characterized in that the solvent system comprises a branched alkane having 12 carbon atoms and a butyl levulinate.

In one embodiment, the method according to the invention is characterized in that the solvent system comprises at least one volatile alkane and one isoamyl levulinate.

In one embodiment, the method according to the invention is characterized in that the solvent system comprises a decane and an isoamyl levulinate.

In one embodiment, the method according to the invention is characterized in that the solvent system comprises a dodecane and an isoamyl levulinate.

In one embodiment, the method according to the invention is characterized in that the solvent system comprises a pinane and an isoamyl levulinate.

In one embodiment, the method according to the invention is characterized in that the solvent system comprises a p-menthane and an isoamyl levulinate.

In one embodiment, the method according to the invention is characterized in that the solvent system comprises a decane, a dodecane, and an isoamyl levulinate.

In one embodiment, the method according to the invention is characterized in that the solvent system comprises a branched alkane having 10 carbon atoms and an isoamyl levulinate.

In one embodiment, the method according to the invention is characterized in that the solvent system comprises a branched alkane having 12 carbon atoms and an isoamyl levulinate.

In one embodiment, the method according to the invention is characterized in that the solvent system is a solvent mixture which further comprises an ethyl lactate.

In one embodiment, the method according to the invention is characterized in that the solvent system comprises an ethyl lactate and a butyl levulinate.

In one embodiment, the method according to the invention is characterized in that the solvent system comprises an ethyl lactate and an ethyl levulinate.

In one embodiment, the method according to the invention is characterized in that the volume ratio X defined by the equation:

$$X = \frac{\text{(oxoester volume)}}{\text{(volume of the other component of the solvent mixture)}}$$

is at least 1/3.

In one embodiment, the method according to the invention is characterized in that the volume ratio X is at least 1/1.

In one embodiment, the method according to the invention is characterized in that the volume ratio X is at least 2/1.

In one embodiment, the method according to the invention is characterized in that the volume ratio X is between 2/1 and 100/1.

In one embodiment, the method according to the invention is characterized in that the volume ratio X is between 2/1 and 50/1.

In one embodiment, the method according to the invention is characterized in that the volume ratio X is between 2/1 and 20/1.

In one embodiment, the method according to the invention is characterized in that the volume ratio X is between 2/1 and 10/1.

In one embodiment, the method according to the invention is characterized in that the volume ratio X is 1/1.

In one embodiment, the method according and the invention is characterized in that the volume ratio X is 2/1.

In one embodiment, the method according to the invention is characterized in that the volume ratio X is 3/1.

In one embodiment, the method according to the invention is characterized in that the volume ratio X is 5/1.

In one embodiment, the method according to the invention is characterized in that the volume ratio X is 10/1.

In one embodiment, the method according to the invention is characterized in that the volume ratio X is 25/1.

In one embodiment, the method according to the invention is characterized in that the volume ratio X is 50/1.

In the present application, the term "solvent content" is understood to mean the ratio of the volume of a solvent relative to the total volume of a solvent mixture, expressed as a percentage.

In one embodiment, the method according to the invention is characterized in that the solvent system has an oxoester content of at least 25% relative to the total volume of the solvent system.

In one embodiment, the method according to the invention is characterized in that the solvent system has an oxoester content of at least 50% relative to the total volume of the solvent system.

In one embodiment, the method according to the invention is characterized in that the solvent system has an oxoester content of between 70 and 100% relative to the total volume of the solvent system.

In one embodiment, the method according to the invention is characterized in that the solvent system has an oxoester content of between 80 and 100% relative to the total volume of the solvent system.

In one embodiment, the method according to the invention is characterized in that the solvent system has a methyl levulinate content of at least 25% relative to the total volume of the solvent system.

In one embodiment, the method according to the invention is characterized in that the solvent system has a methyl levulinate content of at least 50% relative to the total volume of the solvent system.

In one embodiment, the method according to the invention is characterized in that the solvent system has a methyl levulinate content of between 70 and 100% relative to the total volume of the solvent system.

In one embodiment, the method according to the invention is characterized in that the solvent system has a methyl levulinate content of between 80 and 100% relative to the total volume of the solvent system.

In one embodiment, the method according to the invention is characterized in that the solvent system has an ethyl levulinate content of at least 25% relative to the total volume of the solvent system.

In one embodiment, the method according to the invention is characterized in that the solvent system has an ethyl levulinate content of at least 50% relative to the total volume of the solvent system.

In one embodiment, the method according to the invention is characterized in that the solvent system has an ethyl levulinate content of between 70 and 100% relative to the total volume of the solvent system.

In one embodiment, the method according to the invention is characterized in that the solvent system has an ethyl levulinate content of between 80 and 100% relative to the total volume of the solvent system.

In one embodiment, the method according to the invention is characterized in that the solvent system has a butyl levulinate content of at least 25% relative to the total volume of the solvent system.

In one embodiment, the method according to the invention is characterized in that the solvent system has a butyl levulinate content of at least 50% relative to the total volume of the solvent system.

In one embodiment, the method according to the invention is characterized in that the solvent system has a butyl levulinate content of between 70 and 100% relative to the total volume of the solvent system.

In one embodiment, the method according to the invention is characterized in that the solvent system has a butyl levulinate content of between 80 and 100% relative to the total volume of the solvent system.

In one embodiment, the method according to the invention is characterized in that the solvent system has an isoamyl levulinate content of at least 25% relative to the total volume of the solvent system.

In one embodiment, the method according to the invention is characterized in that the solvent system has an isoamyl levulinate content of at least 50% relative to the total volume of the solvent system.

In one embodiment, the method according to the invention is characterized in that the solvent system has an isoamyl levulinate content of between 70 and 100% relative to the total volume of the solvent system.

In one embodiment, the method according to the invention is characterized in that the solvent system has an isoamyl levulinate content of between 80 and 100% relative to the total volume of the solvent system.

In one embodiment, the method according to the invention is characterized in that the solvent mixture has a volatile alkane content of at least 1% relative to the total volume of the solvent system.

In one embodiment, the method according to the invention is characterized in that the solvent mixture has a volatile alkane content of at least 5% relative to the total volume of the solvent system.

In one embodiment, the method according to the invention is characterized in that the solvent mixture has a volatile alkane content of between 1 and 50% relative to the total volume of the solvent system.

In one embodiment, the method according to the invention is characterized in that the solvent mixture has a volatile alkane content of between 5 and 30% relative to the total volume of the solvent system.

In one embodiment, the method according to the invention is characterized in that the solvent mixture has a decane content of at least 1% relative to the total volume of the solvent system.

In one embodiment, the method according to the invention is characterized in that the solvent mixture has a decane content of at least 5% relative to the total volume of the solvent system.

In one embodiment, the method according to the invention is characterized in that the solvent mixture has a decane content of between 1 and 50% relative to the total volume of the solvent system.

In one embodiment, the method according to the invention is characterized in that the solvent mixture has a decane content of between 5 and 30% relative to the total volume of the solvent system.

In one embodiment, the method according to the invention is characterized in that the solvent mixture has a dodecane content of at least 1% relative to the total volume of the solvent system.

In one embodiment, the method according to the invention is characterized in that the solvent mixture has a dodecane content of at least 5% relative to the total volume of the solvent system.

In one embodiment, the method according to the invention is characterized in that the solvent mixture has a dodecane content of between 1 and 50% relative to the total volume of the solvent system.

In one embodiment, the method according to the invention is characterized in that the solvent mixture has a dodecane content of between 5 and 30% relative to the total volume of the solvent system.

In one embodiment, the method according to the invention is characterized in that the solvent mixture has a content of branched alkanes having 10 carbon atoms of at least 1% relative to the total volume of the solvent system.

In one embodiment, the method according to the invention is characterized in that the solvent mixture has a content of branched alkanes having 10 carbon atoms of at least 5% relative to the total volume of the solvent system.

In one embodiment, the method according to the invention is characterized in that the solvent mixture has a content of branched alkanes having 10 carbon atoms of between 1 and 50% relative to the total volume of the solvent system.

In one embodiment, the method according to the invention is characterized in that the solvent mixture has a content of branched alkanes having 10 carbon atoms of between 5 and 30% relative to the total volume of the solvent system.

In one embodiment, the method according to the invention is characterized in that the solvent mixture has a content of branched alkanes having 12 carbon atoms of at least 1% relative to the total volume of the solvent system.

In one embodiment, the method according to the invention is characterized in that the solvent mixture has a content of branched alkanes having 12 carbon atoms of at least 5% relative to the total volume of the solvent system.

In one embodiment, the method according to the invention is characterized in that the solvent mixture has a content of branched alkanes having 12 carbon atoms of between 1 and 50% relative to the total volume of the solvent system.

In one embodiment, the method according to the invention is characterized in that the solvent mixture has a content of branched alkanes having 12 carbon atoms of between 5 and 30% relative to the total volume of the solvent system.

In one embodiment, the method according to the invention is characterized in that the solvent mixture has a content of cyclic alkane or of an alkane which comprises at least one ring of at least 1% relative to the total volume of the solvent system.

In one embodiment, the method according to the invention is characterized in that the solvent mixture has a content of cyclic alkane or of an alkane which comprises at least one ring of at least 5% relative to the total volume of the solvent system.

In one embodiment, the method according to the invention is characterized in that the solvent mixture has a content of cyclic alkane or of an alkane which comprises at least one ring of between 1 and 50% relative to the total volume of the solvent system.

In one embodiment, the method according to the invention is characterized in that the solvent mixture has a content of cyclic alkane or of an alkane which comprises at least one ring of between 5 and 30% relative to the total volume of the solvent system.

In one embodiment, the method according to the invention is characterized in that the solvent mixture has a pinane or para-menthane content of at least 1% relative to the total volume of the solvent system.

In one embodiment, the method according to the invention is characterized in that the solvent mixture has a pinane or para-menthane content of at least 5% relative to the total volume of the solvent system.

In one embodiment, the method according to the invention is characterized in that the solvent mixture has a pinane or para-menthane content of between 1 and 50% relative to the total volume of the solvent system.

In one embodiment, the method according to the invention is characterized in that the solvent mixture has a pinane or para-menthane content of between 5 and 30% relative to the total volume of the solvent system.

In one embodiment, the method according to the invention is characterized in that the solvent mixture has an alkene content of at least 1% relative to the total volume of the solvent system.

In one embodiment, the method according to the invention is characterized in that the solvent mixture has an alkene content of at least 5% relative to the total volume of the solvent system.

In one embodiment, the method according to the invention is characterized in that the solvent mixture has an alkene content of between 1 and 50% relative to the total volume of the solvent system.

In one embodiment, the method according to the invention is characterized in that the solvent mixture has an alkene content of between 5 and 30% relative to the total volume of the solvent system.

In one embodiment, the method according to the invention is characterized in that the solvent mixture has a pinene content of at least 1% relative to the total volume of the solvent system.

In one embodiment, the method according to the invention is characterized in that the solvent mixture has a pinene content of at least 5% relative to the total volume of the solvent system.

In one embodiment, the method according to the invention is characterized in that the solvent mixture has a pinene content of between 1 and 50% relative to the total volume of the solvent system.

In one embodiment, the method according to the invention is characterized in that the solvent mixture has a pinene content of between 5 and 30% relative to the total volume of the solvent system.

In one embodiment, the method according to the invention is characterized in that the solvent mixture has an ethyl lactate content of at least 1% relative to the total volume of the solvent system.

In one embodiment, the method according to the invention is characterized in that the solvent mixture has an ethyl lactate content of at least 5% relative to the total volume of the solvent system.

In one embodiment, the method according to the invention is characterized in that the solvent mixture has an ethyl lactate content of between 1 and 50% relative to the total volume of the solvent system.

In one embodiment, the method according to the invention is characterized in that the solvent mixture has an ethyl lactate content of between 30 and 50% relative to the total volume of the solvent system.

In one embodiment, the method according to the invention is characterized in that the mixing and homogenization of the shea butter are carried out at a temperature of at least 20° C.

In one embodiment, the method according to the invention is characterized in that the mixing and homogenization of the shea butter are carried out at a temperature of between 20 and 80° C.

In one embodiment, the method according to the invention is characterized in that the mixing and homogenization of the shea butter are carried out at a temperature of between 35 and 55° C.

In one embodiment, the method according to the invention is characterized in that the mixing and homogenization of the shea butter are carried out at a temperature of 40° C.

In one embodiment, the method according to the invention is characterized in that the cooling of the reaction mixture is carried out at a temperature of less than 20°.

In one embodiment, the method according to the invention is characterized in that the cooling of the reaction mixture is carried out at a temperature of between −10 and 20° C.

In one embodiment, the method according to the invention is characterized in that the cooling of the reaction mixture is carried out at a temperature of between 5 and 10°.

In one embodiment, the method according to the invention is characterized in that the cooling of the reaction mixture is carried out at a temperature of equal to 4° C.

In one embodiment, the method according to the invention is characterized in that the cooling of the reaction mixture is carried out for a duration of at least 12 hours.

In one embodiment, the method according to the invention is characterized in that the cooling of the reaction mixture is carried out for a preferred duration of 24 hours.

In one embodiment, the method according to the invention is characterized in that the filtration of the reaction mixture is carried out using a filter selected from the group of a single-plate filter, a filter press, a rotary filter, or a candle filter.

In one embodiment, the method according to the invention is characterized in that the elimination of the solvent system comprises at least one step of concentrating the reaction mixture by evaporation.

In one embodiment, the method according to the invention is characterized in that the elimination of the solvent system further comprises at least one step of washing with water.

In one embodiment, the method according to the invention is characterized in that the concentration by evaporation of the reaction mixture makes it possible to eliminate at least 98% of the solvent system relative to the total volume of the solvent system.

In one embodiment, the method according to the invention is characterized in that the concentration by evaporation of the reaction mixture makes it possible to eliminate at least 99.5% of the solvent system relative to the total volume of the solvent system.

In one embodiment, the method according to the invention is characterized in that the at least one washing step using water is carried out at a temperature of at least 20° C.

In one embodiment, the method according to the invention is characterized in that the at least one washing step using water is carried out at a temperature of at least 40° C.

In one embodiment, the method according to the invention is characterized in that the at least one washing step using water is carried out at a temperature of between 40 and 80° C.

In one embodiment, the method according to the invention is characterized in that the at least one washing step using water is carried out at a temperature of 40° C.

In one embodiment, the method according to the invention is characterized in that the at least one washing step using water is carried out at a temperature of 60° C.

In one embodiment, the method according to the invention is characterized in that the at least one washing step using water is carried out with a percent by weight of water of less than or equal to 10% relative to the total weight of fractionated product.

In one embodiment, the method according to the invention is characterized in that the at least one washing step using water is carried out with a percent by weight of water of less than or equal to 5% relative to the total weight of fractionated product.

In one embodiment, the method according to the invention is characterized in that the at least one washing step using water is carried out with a percent by weight of water of equal to 10% relative to the total weight of fractionated product.

In one embodiment, the method according to the invention is characterized in that the at least one washing step using water is carried out with a percent by weight of water of equal to 5% relative to the total weight of fractionated product.

In one embodiment, the method according to the invention is characterized in that the elimination of the solvent system makes it possible to eliminate at least 99.5% of the solvent system relative to the total volume of the solvent system.

In one embodiment, the method according to the invention is characterized in that the elimination of the solvent system makes it possible to eliminate at least 99.9% of the solvent system relative to the total volume of the solvent system.

In one embodiment, the method according to the invention is characterized in that the shea olein fraction is a liquid fraction which comprises the following fatty acids: palmitic acid, stearic acid, oleic acid, linoleic acid, and arachidic acid.

In one embodiment, the method according to the invention is characterized in that the shea olein fraction is a clear liquid fraction.

For the purposes of the present invention, the clarity of a fluid can be evaluated by measuring its turbidity. Turbidity is defined as the reduction in the transparency of a liquid due to the presence of undissolved matter (NF EN ISO 7027). In other words, it corresponds to the sample's property of scattering and absorbing incident light.

In one embodiment, the method according to the invention is characterized in that the olein fraction comprises a percent by weight of palmitic acid of no more than 10% relative to the total weight of fatty acid in the shea olein fraction.

In one embodiment, the method according to the invention is characterized in that the shea olein fraction comprises a percent by weight of palmitic acid of no more than 5% relative to the total weight of fatty acid in the shea olein fraction.

In one embodiment, the method according to the invention is characterized in that the olein fraction comprises a percent by weight of palmitic acid of no more than 4% relative to the total weight of fatty acid in the shea olein fraction.

In one embodiment, the method according to the invention is characterized in that the shea olein fraction comprises a percent by weight of oleic acid of at least 45% relative to the total weight of fatty acid in the shea olein fraction.

In one embodiment, the method according to the invention is characterized in that the olein fraction comprises a percent by weight of oleic acid of at least 50% relative to the total weight of fatty acid in the shea olein fraction.

In one embodiment, the method according to the invention is characterized in that the olein fraction comprises a percent by weight of oleic acid of between 50 and 75% relative to the total weight of fatty acid in the shea olein fraction.

In one embodiment, the method according to the invention is characterized in that the olein fraction comprises a percent by weight of stearic acid of no more than 35% relative to the total weight of fatty acid in the shea olein fraction.

In one embodiment, the method according to the invention is characterized in that the olein fraction comprises a percent by weight of stearic acid of no more than 29% relative to the total weight of fatty acid in the shea olein fraction.

In one embodiment, the method according to the invention is characterized in that the olein fraction comprises a percent by weight of stearic acid of no more than 25% relative to the total weight of fatty acid in the shea olein fraction.

In one embodiment, the method according to the invention is characterized in that the olein fraction comprises a percent by weight of linoleic acid of at least 5% relative to the total weight of fatty acid in the shea olein fraction.

In one embodiment, the method according to the invention is characterized in that the olein fraction comprises a percent by weight of linoleic acid of between 5 and 20% relative to the total weight of fatty acid in the shea olein fraction.

In one embodiment, the method according to the invention is characterized in that the olein fraction comprises a percent by weight of linoleic acid of between 5 and 15% relative to the total weight of fatty acid in the shea olein fraction.

In one embodiment, the method according to the invention is characterized in that the olein fraction comprises a percent by weight of arachidic acid of no more than 5% relative to the total weight of fatty acid in the shea olein fraction.

In one embodiment, the method according to the invention is characterized in that the olein fraction comprises a percent by weight of arachidic acid of no more than 3% relative to the total weight of fatty acid in the shea olein fraction.

In one embodiment, the method according to the invention is characterized in that the olein fraction comprises a percent by weight of arachidic acid of no more than 2% relative to the total weight of fatty acid in the shea olein fraction.

In one embodiment, the method according to the invention is characterized in that the shea olein fraction preferably comprises a percent by weight of no more than 5% of palmitic acid, between 5 and 15% of linoleic acid, no more than 3% of arachidic acid, no more than 29% of stearic acid, and at least 50% of oleic acid relative to the total weight of fatty acid in the shea olein fraction.

In one embodiment, the method according to the invention is characterized in that the shea stearin fraction is a solid fraction which comprises the following fatty acids: palmitic acid, stearic acid, oleic acid, linoleic acid, and arachidic acid.

In one embodiment, the method according to the invention is characterized in that the stearin fraction comprises a percent by weight of palmitic acid of no more than 10% relative to the total weight of fatty acid in the shea stearin fraction.

In one embodiment, the method according to the invention is characterized in that the stearin fraction comprises a percent by weight of palmitic acid of no more than 5% relative to the total weight of fatty acid in the shea stearin fraction.

In one embodiment, the method according to the invention is characterized in that the stearin fraction comprises a percent by weight of palmitic acid of no more than 4% relative to the total weight of fatty acid in the shea stearin fraction.

In one embodiment, the method according to the invention is characterized in that the stearin fraction comprises a percent by weight of oleic acid of between 20 and 40% relative to the total weight of fatty acid in the shea stearin fraction.

In one embodiment, the method according to the invention is characterized in that the stearin fraction comprises a percent by weight of oleic acid of between 30 and 50% relative to the total weight of fatty acid in the shea stearin fraction.

In one embodiment, the method according to the invention is characterized in that the stearin fraction comprises a percent by weight of oleic acid of between 30 and 40% relative to the total weight of fatty acid in the shea stearin fraction.

In one embodiment, the method according to the invention is characterized in that the stearin fraction comprises a percent by weight of stearic acid of between 40 and 60% relative to the total weight of fatty acid in the shea stearin fraction.

In one embodiment, the method according to the invention is characterized in that the stearin fraction comprises a percent by weight of stearic acid of between 50 and 70% relative to the total weight of fatty acid in the shea stearin fraction.

In one embodiment, the method according to the invention is characterized in that the stearin fraction comprises a percent by weight of stearic acid of between 50 and 60% relative to the total weight of fatty acid in the shea stearin fraction.

In one embodiment, the method according to the invention is characterized in that the stearin fraction comprises a percentage by weight of linoleic acid of no more than 10% relative to the total weight of fatty acid in the shea stearin fraction.

In one embodiment, the method according to the invention is characterized in that the stearin fraction comprises a percent by weight of linoleic acid of between 5 and 10% relative to the total weight of fatty acid in the shea stearin fraction.

In one embodiment, the method according to the invention is characterized in that the stearin fraction comprises a percentage by weight of linoleic acid of no more than 5% relative to the total weight of fatty acid in the shea stearin fraction.

In one embodiment, the method according to the invention is characterized in that the stearin fraction comprises a percent by weight of arachidic acid of no more than 5% relative to the total weight of fatty acid in the shea stearin fraction.

In one embodiment, the method according to the invention is characterized in that the stearin fraction comprises a percent by weight of arachidic acid of no more than 3% relative to the total weight of fatty acid in the shea stearin fraction.

In one embodiment, the method according to the invention is characterized in that the stearin fraction comprises a percent by weight of arachidic acid of no more than 2% relative to the total weight of fatty acid in the shea stearin fraction.

In one embodiment, the method according to the invention is characterized in that the shea stearin fraction preferably comprises a percent by weight of no more than 5% in palmitic acid, no more than 5% in acid linoleic, no more than 3% in arachidic acid, between 30 and 40% in oleic acid, and between 50 and 60% in stearic acid relative to the total weight of fatty acid in the shea stearin fraction.

In one embodiment, the method according to the invention is characterized in that the shea olein fraction comprises a percent by weight of unsaponifiable material greater than 8% relative to the total weight of the shea olein fraction.

In one embodiment, the method according to the invention is characterized in that the shea olein fraction comprises a percent by weight of unsaponifiable material greater than 9% relative to the total weight of the shea olein fraction.

In one embodiment, the method according to the invention is characterized in that the shea olein fraction comprises a percent by weight of unsaponifiable material of between 8% and 15% relative to the total weight of the shea olein fraction.

In one embodiment, the method according to the invention is characterized in that the shea olein fraction comprises a percent by weight of unsaponifiable material of between 8% and 10% relative to the total weight of the shea olein fraction.

The applications of the shea olein and stearin fractions obtained by applying the method according to the invention are applications which are aimed at incorporating cosmetic and/or food compositions.

Among the targeted applications we are interested in applications in the field of cosmetics, such as applications to the face, body, and hair, for example.

Examples of some noteworthy food applications include use in the chocolate and confectionery industry and use in baking.

The targeted applications are more specifically those commonly used in the context of shea oleins and stearins, which can be used in the following products or compositions:

Formulation for hair (creams, treatments, styling products, straightening products).

Formulation for the face (make-up formulation, facial care, moisturizing formulation, UV protection, anti-aging formulation, anti-wrinkle formulation).

Formulation for the body (UV protection formulation, anti-aging formulation, anti-wrinkle formulation, moisturizing formulation, depigmenting formulation, pro-pigmenting formulation).

Use as a substitute for cocoa butter.

Use in puff pastry to make the dough pliable.

Use in spreads or margarine.

These exemplary uses are in no way limiting, since the olein and shea stearin fractions studied according to the method of the invention have numerous applications in the area of pharmaceuticals.

These include anti-inflammatory compositions, for example (treatment for joint pain, rheumatism). Furthermore, other examples of use in compositions aimed at solving skin problems (dermatitis, bruises, wound care).

EXAMPLES

The examples which illustrate the method of the present invention below are in no way limiting.

The refined butter used in the rest of these examples has the fatty acid composition indicated in the table below:

TABLE 1

| Fatty acid composition of refined shea butter<br>Refined shea butter<br>Percentages by weight (%) | |
|---|---|
| Palmitic acid | 3.5 |
| Stearic acid | 44.1 |
| Oleic acid | 45.1 |
| Linoleic acid | 5.8 |
| Arachidic acid | 1.5 |

The table below shows a target value range for compositions of shea olein and stearin fractions.

TABLE 2

Target fatty acid composition of shea olein and stearin fractions

| | Shea olein fraction | Shea stearin fraction |
|---|---|---|
| Palmitic acid (%) | [0-5] | [0-5] |
| Stearic acid (%) | Max. 29 | [50-60] |
| Oleic acid (%) | Min. 45 | [30-40] |
| Linoleic acid (%) | [5-15] | [0-5] |
| Arachidic acid (%) | [0-3] | [0-3] |

Example 1: Comparative Example, Fractionation of a Shea Butter Refined with Biosourced Dodecane 60 g of refined shea butter is mixed with 40 g of BIOSYNTHIS dodecane at a temperature of 40° C. Stirring is performed for 5 minutes to obtain a liquid and homogeneous fraction.

The reaction mixture is cooled to a temperature of 4° C. for 24 hours.

The reaction mixture is filtered through 11 um paper. The solvent is evaporated from the shea olein fraction and the shea stearin fraction.

The olein fraction (liquid phase) is concentrated after evaporation under a vacuum of 30 mbar and at a temperature of 150° C.

The stearin fraction (solid phase) is concentrated under the same conditions.

The table below presents the fatty acid compositions of the shea olein and stearin fractions obtained by dodecane fractionation.

TABLE 3

Composition of the products obtained according to a fractionation process carried out with dodecane:

| Product obtained according to the method of the invention: | Shea olein fraction | Shea stearin fraction |
|---|---|---|
| Physical state/ Appearance | Cloudy liquid | Solid |

Fatty acid percent by weight of the fractions obtained according to the method of the invention (%)

| | Shea olein fraction | Shea stearin fraction |
|---|---|---|
| Palmitic acid | 3.6 | 3.6 |
| Stearic acid | 37.7 | 48.1 |
| Oleic acid | 49.9 | 42 |
| Linoleic acid | 7.4 | 5.1 |
| Arachidic acid | 1.4 | 1.2 |

The fractionation process carried out with BIOSYNTHIS dodecane alone does not enable the target composition defined in Table 2 to be obtained, and the olein obtained is not clear.

Example 2: Fractionation of a Shea Butter Refined with Ethyl Levulinate 20 g of refined shea butter is mixed with 80 g of ethyl levulinate at a temperature of 40° C. Stirring is performed for 5 minutes to obtain a liquid and homogeneous fraction.

The reaction mixture is cooled overnight to a temperature of 4° C.

The reaction mixture is filtered through 11 um paper. The solvent is evaporated from the shea olein fraction and the shea stearin fraction.

The olein fraction (liquid phase) is concentrated after evaporation under a vacuum of 30 mbar and at a temperature of 150° C.

The stearin fraction (solid phase) is concentrated under the same conditions.

The table below presents the fatty acid compositions of the shea olein and stearin fractions obtained according to the method of the present invention.

TABLE 4

| Composition of the products obtained according to the method of the present invention (100% ethyl levulinate) | | |
|---|---|---|
| Product obtained according to the method of the invention: | Shea olein fraction | Shea stearin fraction |
| Physical state/ Appearance | Clear liquid | Solid |
| Fatty acid percent by weight of the fractions obtained according to the method of the invention (%) | | |
| | Shea olein fraction | Shea stearin fraction |
| Palmitic acid | 3.6 | 3.1 |
| Stearic acid | 28.2 | 47.9 |
| Oleic acid | 57.9 | 42.6 |
| Linoleic acid | 9.2 | 4.8 |
| Arachidic acid | 1.1 | 1.6 |

The fractionation process carried out with 100% ethyl levulinate makes it possible to obtain a clear olein and a shea stearin having a satisfactory fatty acid composition.

Example 3: Fractionation of a Shea Butter Refined with Ethyl Levulinate 40 g of refined shea butter is mixed with 60 g of ethyl levulinate) at a temperature of 40° C. Stirring is performed for 5 minutes to obtain a liquid and homogeneous fraction.

The reaction mixture is cooled overnight to a temperature of 4° C.

The reaction mixture is filtered through 11 um paper. The solvent is evaporated from the shea olein fraction and the shea stearin fraction.

The olein fraction (liquid phase) is concentrated after evaporation under a vacuum of 30 mbar and at a temperature of 150° C.

The stearin fraction (solid phase) is concentrated under the same conditions.

The table below presents the fatty acid compositions of the shea olein and stearin fractions obtained according to the method of the present invention.

TABLE 5

| Composition of the products obtained according to the method of the present invention (100% ethyl levulinate) | | |
|---|---|---|
| Product obtained according to the method of the invention: | Shea olein fraction | Shea stearin fraction |
| Physical state/ Appearance | Clear liquid | Solid |
| Fatty acid percent by weight of the fractions obtained according to the method of the invention (%) | | |
| | Shea olein fraction | Shea stearin fraction |
| Palmitic acid | 3.7 | 3.1 |
| Stearic acid | 27.9 | 45.7 |
| Oleic acid | 57.5 | 44.3 |
| Linoleic acid | 9.8 | 5.3 |
| Arachidic acid | 1.1 | 1.6 |

The fractionation process carried out with 100% ethyl levulinate makes it possible to obtain a clear olein and a shea stearin with satisfactory fatty acid compositions.

Example 4: Fractionation of a Shea Butter Refined with an Ethyl Levulinate-Decane Mixture 20 g of refined shea butter is mixed with 56 g of ethyl levulinate and 24 g of BIOSYNTHIS decane at a temperature of 40° C. Stirring is performed for 5 minutes to obtain a liquid and homogeneous fraction.

The reaction mixture is cooled overnight to a temperature of 4° C.

The reaction mixture is filtered through 11 μm paper. The solvent is evaporated from the shea olein fraction and the shea stearin fraction.

The olein fraction (liquid phase) is concentrated after evaporation under a vacuum of 30 mbar and at a temperature of 150° C.

The stearin fraction (solid phase) is concentrated under the same conditions.

The table below presents the fatty acid compositions of the shea olein and stearin fractions obtained according to the method of the present invention.

TABLE 6

| Composition of the products obtained according to the method of the present invention (70% ethyl levulinate, 30% decane) | | |
|---|---|---|
| Product obtained according to the method of the invention: | Shea olein fraction | Shea stearin fraction |
| Physical state/ Appearance | Clear liquid | Solid |
| Fatty acid percent by weight of the fractions obtained according to the method of the invention (%) | | |
| | Shea olein fraction | Shea stearin fraction |
| Palmitic acid | 3.4 | 2.6 |
| Stearic acid | 39.9 | 56.9 |
| Oleic acid | 48.3 | 35.8 |
| Linoleic acid | 6.5 | 3.3 |
| Arachidic acid | 1.9 | 1.4 |

The fractionation process carried out with 70% ethyl levulinate and 30% decane makes it possible to obtain a clear olein and a shea stearin with satisfactory fatty acid compositions.

Example 5: Fractionation of a Shea Butter Refined with an Ethyl Levulinate/Decane Mixture 20 g of refined shea butter is mixed with 70 g of ethyl levulinate and 10 g of BIOSYNTHIS decane at a temperature of 40° C. Stirring is performed for 5 minutes to obtain a liquid and homogeneous fraction.

The reaction mixture is cooled overnight to a temperature of 4° C.

The reaction mixture is filtered through 11 um paper. The solvent is evaporated from the shea olein fraction and the shea stearin fraction.

The olein fraction (liquid phase) is concentrated after evaporation under a vacuum of 30 mbar and at a temperature of 150° C.

The stearin fraction (solid phase) is concentrated under the same conditions.

The table below presents the fatty acid compositions of the shea olein and stearin fractions obtained according to the method of the present invention.

TABLE 7

| Composition of the products obtained according to the method of the present invention (87.5% ethyl levulinate, 12.5% decane) | | |
|---|---|---|
| Product obtained according to the method of the invention: | Shea olein fraction | Shea stearin fraction |
| Physical state/ Appearance | Clear liquid | Solid |
| **Fatty acid percent by weight of the fractions obtained according to the method of the invention (%)** | | |
| | Shea olein fraction | Shea stearin fraction |
| Palmitic acid | 3.5 | 3.1 |
| Stearic acid | 29.4 | 46.1 |
| Oleic acid | 56.8 | 43.8 |
| Linoleic acid | 9.1 | 5.4 |
| Arachidic acid | 1.2 | 1.6 |

The fractionation process carried out with 87.5% ethyl levulinate and 12.5% decane makes it possible to obtain a clear olein and a shea stearin with satisfactory fatty acid compositions.

Example 6: Fractionation of Shea Butter Refined with an Ethyl Levulinate/Decane Mixture 20 g of refined shea butter is mixed with 75 g of ethyl levulinate and 5 g of BIOSYNTHIS decane at a temperature of 40° C. Stirring is performed for 5 minutes to obtain a liquid and homogeneous fraction.

The reaction mixture is cooled overnight to a temperature of 4° C.

The reaction mixture is filtered through 11 um paper. The solvent is evaporated from the shea olein fraction and the shea stearin fraction.

The olein fraction (liquid phase) is concentrated after evaporation under a vacuum of 30 mbar and at a temperature of 150° C.

The stearin fraction (solid phase) is concentrated under the same conditions.

The table below presents the fatty acid compositions of the shea olein and stearin fractions obtained according to the the method of the present invention.

TABLE 8

| Composition of the products obtained according to the method of the present invention (94% ethyl levulinate, 6% decane) | | |
|---|---|---|
| Product obtained according to the method of the invention: | Shea olein fraction | Shea stearin fraction |
| Physical state/ Appearance | Clear liquid | Solid |
| **Fatty acid percent by weight of the fractions obtained according to the method of the invention (%)** | | |
| | Shea olein fraction | Shea stearin fraction |
| Palmitic acid | 3.5 | 3.2 |
| Stearic acid | 25.4 | 44.6 |
| Oleic acid | 60.1 | 45.0 |
| Linoleic acid | 10.0 | 5.6 |
| Arachidic acid | 1.0 | 1.6 |

The fractionation process carried out with 94% ethyl levulinate and 6% decane makes it possible to obtain a clear olein and a shea stearin with satisfactory fatty acid compositions.

Example 7: Fractionation of Shea Butter Refined with an Ethyl Levulinate/Dodecane Mixture 20 g of refined shea butter is mixed with 75 g of ethyl levulinate and 5 g of BIOSYNTHIS dodecane at a temperature of 40° C. Stirring is performed for 5 minutes to obtain a liquid and homogeneous fraction.

The reaction mixture is cooled overnight to a temperature of 4° C.

The reaction mixture is filtered through 11 ium paper. The solvent is evaporated from the shea olein fraction and the shea stearin fraction.

The olein fraction (liquid phase) is concentrated after evaporation under a vacuum of 30 mbar and at a temperature of 150° C.

The stearin fraction (solid phase) is concentrated under the same conditions.

The table below presents the fatty acid compositions of the shea olein and stearin fractions obtained according to the method of the present invention.

TABLE 9

| Composition of the products obtained according to the method of the present invention (94% ethyl levulinate, 6% dodecane). | | |
|---|---|---|
| Product obtained according to the method of the invention: | Shea olein fraction | Shea stearin fraction |
| Physical state/ Appearance | Clear liquid | Solid |
| **Fatty acid percent by weight of the fractions obtained according to the method of the invention (%)** | | |
| | Shea olein fraction | Shea stearin fraction |
| Palmitic acid | 4.3 | 3.4 |
| Stearic acid | 22.1 | 44.1 |
| Oleic acid | 61.3 | 45.4 |
| Linoleic acid | 12 | 5.6 |
| Arachidic acid | 0.3 | 1.5 |

The fractionation process carried out with 94% ethyl levulinate and 6% dodecane makes it possible to obtain a clear olein and a shea stearin with satisfactory fatty acid compositions.

Example 8: Fractionation of a Shea Butter Refined with a Mixture of Ethyl Levulinate and Ethyl Lactate 20 g of refined shea butter is mixed with 40 g of ethyl levulinate and 40 g of ethyl lactate at a temperature of 40° C. Stirring is performed for 5 minutes to obtain a liquid and homogeneous fraction.

The reaction mixture is cooled overnight to a temperature of 4° C.

The reaction mixture is filtered through 11 um paper. The solvent is evaporated from the shea olein fraction and the shea stearin fraction.

The olein fraction (liquid phase) is concentrated after evaporation under a vacuum of 30 mbar and at a temperature of 150° C.

The stearin fraction (solid phase) is concentrated under the same conditions.

The table below presents the fatty acid compositions of the shea olein and stearin fractions obtained according to the method of the present invention.

TABLE 10

| Composition of the products obtained according to the method of the present invention (50% ethyl levulinate and 50% ethyl lactate) | | |
|---|---|---|
| Product obtained according to the method of the invention: | Shea olein fraction | Shea stearin fraction |
| Physical state/ Appearance | Cloudy liquid | Solid |
| Fatty acid percent by weight of the fractions obtained according to the method of the invention (%) | | |
| | Shea olein fraction* | Shea stearin fraction |
| Palmitic acid | 3.9 | 3.4 |
| Stearic acid | 28 | 48.8 |
| Oleic acid | 57.2 | 41.2 |
| Linoleic acid | 9.9 | 5.1 |
| Arachidic acid | 1 | 1.5 |

The fractionation process carried out with 50% ethyl levulinate and 50% ethyl lactate makes it possible to obtain a shea olein with a satisfactory fatty acid composition but in the form of a cloudy liquid.

Example 9: Fractionation of a Shea Butter Refined with Butyl Levulinate 20 g of refined shea butter is mixed with 80 g of butyl levulinate at a temperature of 40° C. Stirring is performed for 5 minutes to obtain a liquid and homogeneous fraction.

The reaction mixture is cooled overnight to a temperature of 4° C.

The reaction mixture is filtered through 11 um paper. The solvent is evaporated from the shea olein fraction and the shea stearin fraction.

The olein fraction (liquid phase) is concentrated after evaporation under a vacuum of 30 mbar and at a temperature of 150° C.

The stearin fraction (solid phase) is concentrated under the same conditions.

The table below presents the fatty acid compositions of the shea olein and stearin fractions obtained according to the method of the present invention.

TABLE 11

| Composition of the products obtained according to the method of the present invention (100% butyl levulinate) | | |
|---|---|---|
| Product obtained according to the method of the invention: | Shea olein fraction | Shea stearin fraction |
| Physical state/ Appearance | Clear liquid | Solid |
| Fatty acid percent by weight of the fractions obtained according to the method of the invention (%) | | |
| | Shea olein fraction | Shea stearin fraction |
| Palmitic acid | 4.3 | 3.3 |
| Stearic acid | 29.2 | 56.3 |
| Oleic acid | 56.8 | 35.8 |
| Linoleic acid | 8.4 | 2.9 |
| Arachidic acid | 1.3 | 1.7 |

The fractionation process carried out with 100% butyl levulinate makes it possible to obtain a clear olein and a shea stearin, both having a satisfactory fatty acid composition while satisfying the regulatory requirements of the cosmetics and food industry.

Example 10: Fractionation of a Shea Butter Refined with Butyl Levulinate and Pinane 20 g of refined shea butter is mixed with 75 g of butyl levulinate and 5 g of pinane at a temperature of 40° C. Stirring is performed for 5 minutes to obtain a liquid and homogeneous fraction.

The reaction mixture is cooled overnight to a temperature of 4° C.

The reaction mixture is filtered through 11 um paper. The solvent is evaporated from the shea olein fraction and the shea stearin fraction.

The olein fraction (liquid phase) is concentrated after evaporation under a vacuum of 30 mbar and at a temperature of 150° C.

The stearin fraction (solid phase) is concentrated under the same conditions.

The table below presents the fatty acid compositions of the shea olein and stearin fractions obtained according to the method of the present invention.

TABLE 12

| Composition of the products obtained according to the method of the present invention (94% butyl levulinate and 6% pinane) | | |
|---|---|---|
| Product obtained according to the method of the invention: | Shea olein fraction | Shea stearin fraction |
| Physical state/ Appearance | Clear liquid | Solid |
| Fatty acid percent by weight of the fractions obtained according to the method of the invention (%) | | |
| | Shea olein fraction | Shea stearin fraction |
| Palmitic acid | 4.1 | 3.3 |
| Stearic acid | 29.8 | 52.7 |
| Oleic acid | 55.9 | 38.3 |
| Linoleic acid | 8.9 | 4.1 |
| Arachidic acid | 1.3 | 1.6 |

The fractionation process carried out with 94% butyl levulinate and 6% pinane makes it possible to obtain a clear olein and a shea stearin having a satisfactory fatty acid composition while satisfying the regulatory requirements of the cosmetics and food industry.

Example 11: Fractionation of a Shea Butter Refined with Butyl Levulinate and Limonene 20 g of refined shea butter is mixed with 70 g of butyl levulinate and 10 g of limonene at a temperature of 40° C. Stirring is performed for 5 minutes to obtain a liquid and homogeneous fraction.

The reaction mixture is cooled overnight to a temperature of 4° C.

The reaction mixture is filtered through 11 um paper. The solvent is evaporated from the shea olein fraction and the shea stearin fraction.

The olein fraction (liquid phase) is concentrated after evaporation under a vacuum of 30 mbar and at a temperature of 150° C.

The stearin fraction (solid phase) is concentrated under the same conditions.

The table below presents the fatty acid compositions of the shea olein and stearin fractions obtained according to the method of the present invention.

TABLE 13

| Composition of the products obtained according to the method of the present invention (88% butyl levulinate and 12% limonene) | | |
|---|---|---|
| Product obtained according to the method of the invention: | Shea olein fraction | Shea stearin fraction |
| Physical state/ Appearance | Clear liquid | Solid |
| Fatty acid percent by weight of the fractions obtained according to the method of the invention (%) | | |
| | Shea olein fraction | Shea stearin fraction |
| Palmitic acid | 3.5 | 3.4 |
| Stearic acid | 31.4 | 55.3 |
| Oleic acid | 55.1 | 36.1 |
| Linoleic acid | 7.4 | 3.5 |
| Arachidic acid | 2.6 | 1.7 |

The fractionation process carried out with 88% butyl levulinate and 12% limonene makes it possible to obtain a clear olein and a solid shea stearin.

The composition of shea stearin conforms to that referred to in the specifications in Table 2.

Example 12

Comparison of the content of unsaponifiable materials in the olein of shea butter fractionated according to the present invention (under the operating conditions of Example 9 above) to that of a commercial shea olein:

The content of unsaponifiable materials was measured from shea olein fractionated according to the method of the present invention under the operating conditions of Example 9, namely using a solvent system consisting solely of butyl levulinate.

The content of unsaponifiable materials in the fractionated shea olein in Example 9 is 9.69% relative to the total weight of this shea olein.

In contrast, commercial shea olein LIPEX 205 from AAK AB has an unsaponifiable matter content of 8%.

As a result, the method according to the present invention makes it possible to obtain a shea olein with a very satisfactory unsaponifiable material content.

Furthermore, this high content of unsaponifiable matter is particularly sought after by cosmetic formulators for their remarkable activity. More specifically, the molecules constituting the unsaponifiable materials have antioxidant and/or anti-inflammatory properties, making them compounds of choice for the formulation of anti-wrinkle or anti-aging compositions.

The invention claimed is:

1. A method of fractionating a shea extract, comprising at least the following steps:
  a) mixing and homogenization of shea butter using a solvent system comprising at least one oxoester of formula I, Formula I

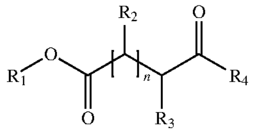

in which $R_1$ is selected from the group consisting of linear or branched alkyls comprising from 1 to 8 carbon atoms;

$R_2$, $R_3$, and $R_4$, which are identical or different, are selected from the group consisting of hydrogen atom or linear or branched alkyls comprising from 1 to 4 carbon atoms; and and n is a natural number between 1 and 4, b) obtaining a homogeneous mixture,
  c) cooling of the mixture,
  d) filtration and removal of the solvent system in order to recover the olein and stearin fractions.

2. The method as set forth in claim 1, wherein in the homogeneous mixture obtained in step b) is defined by the ratio Y such that:

$$Y = \frac{\text{percent by weight of shea extract}}{\text{percent by weight of the solvent system}}$$

no more than 1/1.

3. The method as set forth in claim 1, wherein the solvent system has a flash point of less than or equal to 100° C. as measured according to the ATSM D93 standard.

4. The method as set forth in claim 1, wherein the solvent system has a boiling temperature of less than or equal to 210° C.

5. The method as set forth in claim 1, wherein the solvent system comprises at least one oxoester of formula II:

Formula II

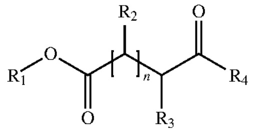

in which $R_1$ is selected from the group consisting of linear or branched alkyls comprising from 1 to 4 carbon atoms;

$R_2$, $R_3$, and $R_4$, which are identical or different, are selected from the group consisting of hydrogen atom or linear or branched alkyls comprising from 1 to 4 carbon atoms; and and n is a natural number between 1 and 4.

6. The method as set forth in claim 1, wherein the solvent system comprises at least one oxoester of formula III:

Formula III

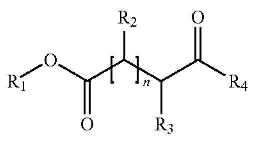

$R_1$ is selected from the group consisting of linear or branched alkyls comprising from 1 to 4 carbon atoms;

$R_2$ and $R_3$, which are identical or different, are selected from the group consisting of hydrogen atom, methyl group, or ethyl group;

$R_4$ is selected from the group consisting of linear or branched alkyls comprising from 1 to 3 carbon atoms;

and n is a natural number between 1 and 3.

7. The method as set forth in claim 1, wherein the solvent system comprises at least one oxoester of formula IV:

Formula IV

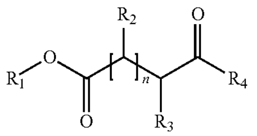

$R_1$ is selected from the group consisting of linear or branched alkyls comprising from 1 to 8 carbon atoms;

$R_2$ and $R_3$ are a hydrogen atom;

$R_4$ is a methyl group;

and n is equal to 1.

8. The method as set forth in claim 1, wherein the solvent system comprises at least one oxoester of formula V:

Formula V

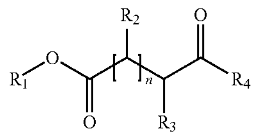

$R_1$ is selected from the group consisting of linear or branched alkyls comprising from 1 to 4 carbon atoms;

$R_2$ and $R_3$ are a hydrogen atom;

$R_4$ is a methyl group;

and n is equal to 1.

9. The method as set forth in claim 1, wherein the solvent system has an oxoester content of between 70 and 100% relative to the total volume of the solvent system.

10. The method as set forth in claim 1, wherein the solvent system further comprises at least one alkene.

11. The method as set forth in claim 1, wherein the solvent system further comprises at least one cyclic alkene.

12. The method as set forth in claim 10, wherein the cyclic alkene is selected from the group comprising the cyclic alkenes having from 8 to 12 carbon atoms, alone or as mixtures.

13. The method as set forth in claim 1, wherein the solvent system further comprises limonene (CAS 5989-27-5).

14. The method as set forth in claim 1, wherein the solvent system further comprises at least one alkane.

15. The method as set forth in claim 1, wherein the solvent system further comprises at least one volatile alkane.

16. The method as set forth in claim 14, wherein the volatile alkane is selected from the group comprising the linear or branched alkanes having from 10 to 12 carbon atoms, alone or as mixtures.

17. The method as set forth in claim 14, wherein the volatile alkane is selected from the group comprising the linear or branched bioalkanes having from 10 to 12 carbon atoms, alone or as mixtures.

18. The method as set forth in claim 1, wherein the solvent system further comprises a cyclic alkane or an alkane which comprises at least one ring.

19. The method as set forth in claim 18, wherein the alkane comprising at least one ring is pinane (CAS 473-55-2).

20. The method as set forth in claim 18, wherein the alkane comprising at least one ring is p-menthane (CAS 99-82-1).

21. The method as set forth in claim 1, wherein the solvent system further comprises a branched alkane having 10 carbon atoms.

22. The method as set forth in claim 1, wherein the solvent system has an oxoester content of at least 25% relative to the total volume of the solvent system.

23. The method as set forth in claim 1, wherein the solvent system is a solvent mixture which further comprises an ethyl lactate.

24. The method as set forth in claim 1, wherein the elimination of the solvent system makes it possible to eliminate at least 99.9% of the solvent system relative to the total volume of the solvent system.

25. The method as set forth in claim 1, wherein the solvent system comprises at least one volatile alkane and one ethyl levulinate.

26. The method as set forth in claim 1, wherein the solvent system comprises at least one volatile alkane and one butyl levulinate.

27. The method as set forth in claim 1, wherein the solvent system comprises a branched alkane having 10 carbon atoms and an ethyl levulinate.

* * * * *